United States Patent
Lin et al.

(10) Patent No.: US 7,245,878 B2
(45) Date of Patent: Jul. 17, 2007

(54) METHOD AND APPARATUS FOR SILENT FRAME DETECTION IN A GSM COMMUNICATIONS SYSTEM

(75) Inventors: Jingdong Lin, Irvine, CA (US); Yan Zhang, NanJing (CN); Jiayi Zhuang, Shanghai (CN); Jian Cheng, Shanghai (CN)

(73) Assignee: Spreadtrum Communications Corporation, Sunnyvale, CA (US)

( * ) Notice: Subject to any disclaimer, the term of this patent is extended or adjusted under 35 U.S.C. 154(b) by 546 days.

(21) Appl. No.: 10/696,397

(22) Filed: Oct. 28, 2003

(65) Prior Publication Data

US 2005/0090293 A1    Apr. 28, 2005

(51) Int. Cl.
*H04B 1/00* (2006.01)
*H04B 15/00* (2006.01)

(52) U.S. Cl. .............. 455/63.1; 455/67.11; 455/114.2; 455/115.1; 375/227; 375/340; 375/342

(58) Field of Classification Search .............. 455/63.1, 455/67.11, 114.2, 115.1, 115.2; 375/227, 375/340, 342, 346
See application file for complete search history.

(56) References Cited

U.S. PATENT DOCUMENTS

| | | | | |
|---|---|---|---|---|
| 6,067,319 A | * | 5/2000 | Copeland | 375/232 |
| 6,438,180 B1 | * | 8/2002 | Kavcic et al. | 375/341 |
| 6,810,273 B1 | * | 10/2004 | Mattila et al. | 455/570 |
| 2003/0224771 A1 | * | 12/2003 | Nogueiro et al. | 455/418 |
| 2005/0003766 A1 | * | 1/2005 | Chen | 455/67.11 |

* cited by examiner

*Primary Examiner*—Matthew Anderson
*Assistant Examiner*—Tuan Pham
(74) *Attorney, Agent, or Firm*—Perkins Coie LLP

(57) ABSTRACT

A method of detecting a silent frame at a mobile station in a GSM transmission is disclosed. The method comprises first receiving a data burst intended for the mobile station. Then, a signal-to-interference-and-noise ratio (SINR) is determined for the data burst. If the SINR is below a predetermined threshold, then the data burst is determined as from a silent frame.

2 Claims, 2 Drawing Sheets

METHOD AND APPARATUS FOR SILENT FRAME DETECTION IN A GSM COMMUNICATIONS SYSTEM

FIELD OF THE INVENTION

The present invention relates to silent frame detection in a mobile communication system, and more particularly, to silent frame detection in a GSM system during discontinuous transmission (DTX) mode.

BACKGROUND OF THE INVENTION

The most common use of the Global System for Mobile telecommunications (GSM) mobile communication system is to transmit voice. It is well known that during a normal conversation, the participants alternate so that, on the average, each direction of transmission is occupied only about 50% of the time. Discontinuous transmission (DTX) is a mode of operation in the GSM system where the base station and mobile transmitters are switched on only for those frames which contain useful information. This is done in order to prolong battery life at the mobile station and to reduce the average interference level over the "air", leading to better spectrum efficiency.

When DTX mode is enabled in communication, the received frames (one frame contains eight bursts and only one burst is allocated to one user in most conditions for GSM system) can be classified by the mobile station as either useful or silent. The useful frames carry data bits and the silent frames contain only noise and interference.

It is important to determine which frames are useful frames and which frames are silent frames. If the type of the received frame is not known, certain measurement processes in the mobile station will be erroneously based on the noise and interference of a silent frame. For example, if silent frames are not discarded, processes such as the measurement of received signal strength information (RSSI) will be nonsensical. This error will cascade into other processes such as the automatic gain control (AGC). Therefore, it is important to determine whether a received frame is a useful frame or a silent frame at the mobile station.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

In the detailed description provided below, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The invention described herein provides a method to detect and identify silent frames at a mobile station of a GSM system during DTX mode. The detection results indicate whether the received frames are useful or silent. This information can then be used to adjust other parts of the mobile station, e.g. AGC, AFC, . . . .

Figure 1:
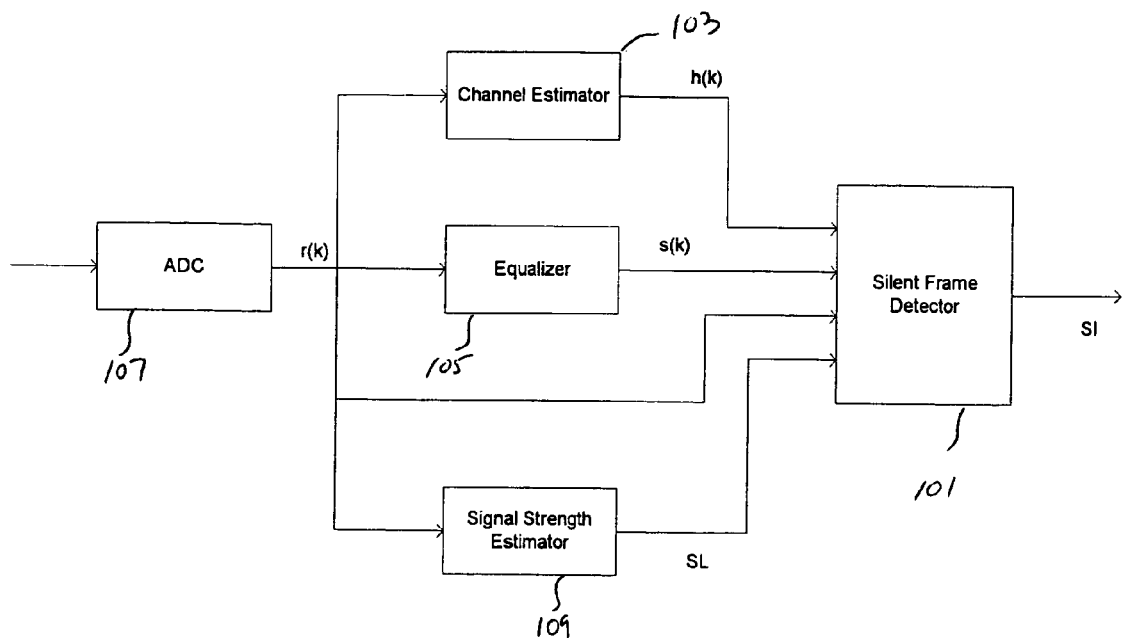
FIG. 1 is a schematic diagram showing the types of inputs required for the method of the present invention.

FIG. 1 shows the location (and required inputs) of a silent frame detection module 101 in a GSM receiver of the mobile station. As is known to those of ordinary skill in the art, a channel estimation block 103, an equalizer 105, and a signal strength estimator 109 are key function blocks in a GSM mobile station. The outputs of the channel estimation block 103, the equalizer 105, and the signal strength estimator are inputs to the silent frame detection module 101. Specifically, in each burst, the outputs of channel estimation block 103 can be denoted as h(k), k=1, 2, . . . , K, where K is the tap number of channel estimator. The outputs of equalizer 105 can be denoted as s(k). The output of the signal strength estimator 109 is denoted as SL (for signal level). Another input to the silent frame detection block 101 is the received raw data r(k) from the received burst directly from the analog to digital converter 107.

Figure 2:
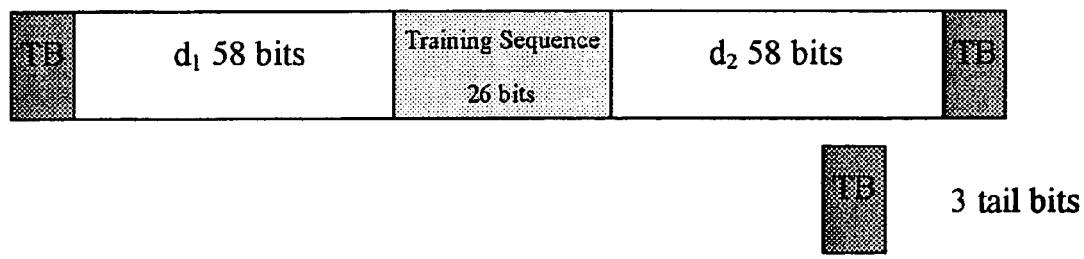
FIG. 2 is a schematic diagram illustrating the data structure of a data burst of a frame.

As background, in the GSM system, data on the traffic channel is carried by a normal burst. The data structure of a normal burst is shown in FIG. 2. Specifically, one normal burst contains 116 encrypted bits, 26 training sequence bits and 6 tail bits. The 116 encrypted bits are separated into two parts $d_i(n)$, i=1, 2; n=1, 2, . . . , 58; each part has 58 bits.

Figure 3:
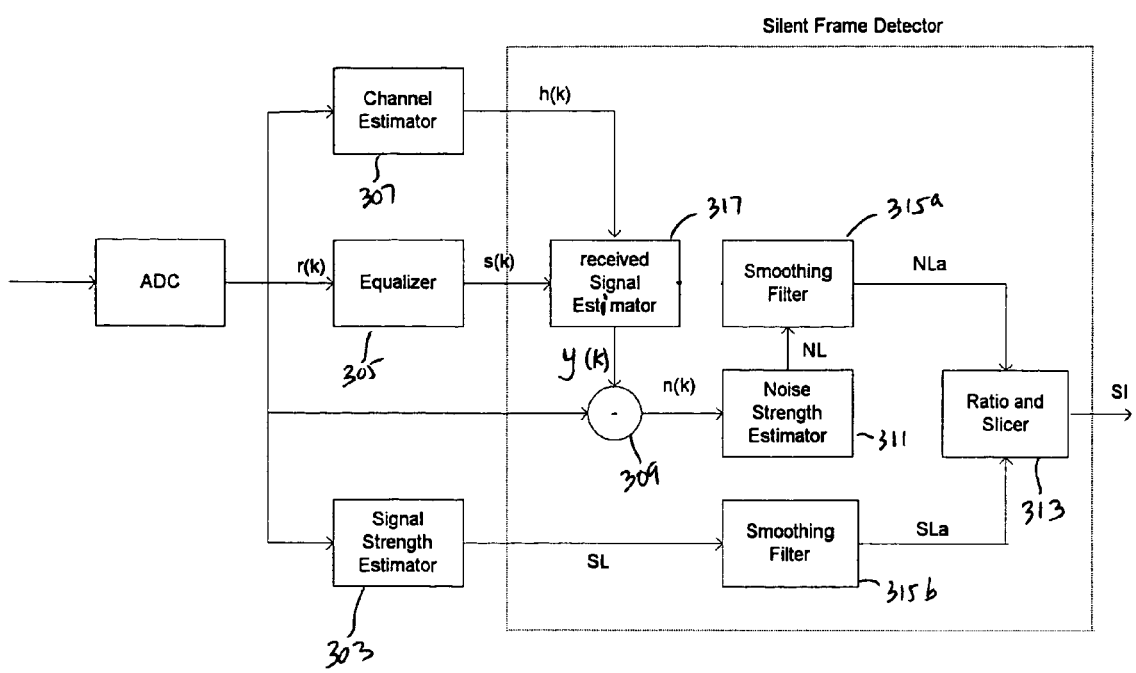
FIG. 3 is a detailed block diagram illustrating the method of the present invention.

In accordance with the present invention, FIG. 3 illustrates in detail the method and apparatus of how the silent frame detection block 101 operates. In particular, a received signal r(k) is obtained from the ADC 107 in the mobile station. The received signal r(k) is provided to a signal level estimator 303, an equalizer 305, and a channel estimator 307. All of these elements are normally provided in a GSM mobile station. Thus, the signal level estimator 303 is a conventional function/block found in nearly all GSM mobile stations. The signal level estimator 303 outputs a value that is indicative of the signal level of the received signal r(k). The signal level is denoted as SL.

The received signal r(k) is also provided to the equalizer 305 and channel estimator 307. The equalizer outputs a signal s(k) that is an approximation of the encoded data that was modulated for transmission. The channel estimator 307 produces an estimation h(k) signal that is an estimation of the effect of the equivalent channel response. By convolving the output from the channel estimator 307 and the equalizer 305 at a received signal estimator 317, a recovered signal is received. Optimally, the recovered signal is close to the original signal minus the noise.

Next, at a subtraction circuit 309, the received signal r(k) and the recovered signal are subtracted from each other and the result is a noise signal n(k). The noise signal n(k) is indicative of the amount of noise injected by the over-the-air channel and the noise figure in the mobile station.

The noise signal n(k) is then provided to a noise level estimator 311 which provides a value indicative of the level of the noise in the signal and designated as NL. Optionally, smoothing filters 315a and 315b are applied to both the signal strength estimate SL and the noise strength estimate NL on a burst by burst basis. The outputs of the smoothing filters are averaged signal strength SLa and average noise strength NLa. A ratio and slicer block 313 then computes the ratio of the averaged signal level SLa and the averaged noise level NLa. Then, the ratio is compared to a threshold, and if it is consistently above a predetermined threshold, this indicates that the received data was from a useful frame. However, if the signal-to-noise ratio is below a predetermined threshold, then this indicates that the received data was from a silent frame. The signal output by the ratio and slicer block 313 is a silent frame indication signal (SI).

The above functional description of the present invention can also be described mathematically. Referring back to FIG. 2, at the mobile station, the mid-amble training sequence can be denoted mathematically as $$T(k) = \begin{cases} 1 \text{ or} \\ -1 \end{cases}, k = 1, 2, \ldots, 26.$$

The tail bits are always '1' in the GSM system.

The GSM system uses Gaussian minimum shift keyed (GMSK) modulation and the estimated received burst can be calculated by:

$$y(k) = (s(k) * h(k)) \cdot j^{k-1} \ k=1, 2, \ldots, 148$$

where * indicates a convolution integral.

Thus, the noise and interference can be estimated by the following formula:

$$n(k) = r(k) - y(k) \ k=1, 2, \ldots, 148$$

With the noise and interference estimated, the signal-to-interference plus noise ratio (SINR) can be calculated by:

$$SINR = \frac{SLa}{NLa} = \frac{\frac{1}{148}\sum_{k=1}^{148}|y(k)|^2}{\frac{1}{148}\sum_{k=1}^{148}|n(k)|^2}$$

Note that in the present invention, the SINR is calculated with a particular technique described above. However, the signal "numerator" and the noise "denominator" may be calculated in a variety of ways and the specific formulas disclosed herein should not be construed as limiting. Thus, the SINR may be replaced with a variety of signal to noise ratio (SNR) calculations. No matter which ratio is used or the semantic terminology (as between SINR and SNR), the ratio is between the received signal and a noise valuation. Thus, the term SINR as used herein should be a generic term.

The important aspect of the present invention is the examination of the SINR value over the burst. If the received burst contains useful bits, the estimated SINR should be a relatively high value. In a silent frame, because the received "data" is only noise and interference, the estimated SINR should be a relatively lower value. If a suitable threshold is set, whether the received frame is useful or silent can be detected by comparing the SINR to the threshold.

The detection result SI can be written as follows:

$$SI = \begin{cases} 1, & \text{if } SINR < T \\ 0, & \text{if } SINR \geq T \end{cases} \quad [\text{Formula 7}]$$

wherein T represents the threshold, SI equal to 1 means that the current frame is silent, and SI equal to 0 means the current frame is useful.

As noted above with respect to the optional smoothing filters 315a and 315b, for more stability and reliability, the values of SL and NL can be filtered (using a low pass filter) before being applied to calculate the SINR as follows:

$$SLa(k) = (1-\beta) * SL(k) + \beta * SLa(k-1)$$

$$NLa(k) = (1-\beta) * NL(k) + \beta * NLa(k-1)$$

where β is the forgetting factor. The value of β is between 0 and 1. In one actual embodiment, the threshold T is set as 0.15 and β is set as 0.95. It has been found through simulation that a threshold under 0.2 provides good performance.

While the preferred embodiment of the invention has been illustrated and described, it will be appreciated that various changes can be made therein without departing from the spirit and scope of the invention.

The embodiment of the invention is which an exclusive property of privilege is claimed are defined as follows:

1. A method of detecting a silent frame at a mobile station in a GSM transmission comprising:

(a) receiving a data burst intended for said mobile station;

(b) determining a signal-to-interference-and-noise ratio (SINR) for said data burst as:

$$SINR = \frac{SLa}{NLa} = \frac{\frac{1}{148}\sum_{k=1}^{148}|y(k)|^2}{\frac{1}{148}\sum_{k=1}^{148}|n(k)|^2}; \text{ and}$$

(c) outputting a silent frame indication signal (SI) determined by $$SI = \begin{cases} 1, & \text{if } SINR < T \\ 0, & \text{if } SINR \geq T \end{cases}$$

where if SI is 1, then identifying said data burst as from a silent frame.

2. The method of claim 1, wherein if SI is 0, then identifying said data burst as a useful frame.

* * * * *